United States Patent
Allmon et al.

(10) Patent No.: US 7,384,199 B2
(45) Date of Patent: Jun. 10, 2008

(54) APPARATUS FOR CENTERING ROTOR ASSEMBLY BEARINGS

(75) Inventors: Barry Lynn Allmon, Maineville, OH (US); Richard Leon Riffle, Amelia, OH (US); Jerry Lynn Cabe, Cincinnati, OH (US); Duane Howard Anstead, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 718 days.

(21) Appl. No.: 10/928,940

(22) Filed: Aug. 27, 2004

(65) Prior Publication Data

US 2006/0045404 A1 Mar. 2, 2006

(51) Int. Cl.
F16C 27/04 (2006.01)
(52) U.S. Cl. ...................... 384/581; 415/229
(58) Field of Classification Search .................. 384/99, 384/535, 581, 215; 415/229; 267/7, 133, 267/160, 164
See application file for complete search history.

(56) References Cited

U.S. PATENT DOCUMENTS

| | | | |
|---|---|---|---|
| 3,460,873 A | 8/1969 | Roney | |
| 3,738,719 A | 6/1973 | Langner | |
| 4,214,796 A | 7/1980 | Monzel | |
| 4,313,712 A | 2/1982 | Briggs | |
| 4,337,982 A * | 7/1982 | Moringiello et al. | 384/99 |
| 4,375,906 A | 3/1983 | Roberts et al. | |
| 4,400,098 A | 8/1983 | Lacey et al. | |
| 4,429,923 A | 2/1984 | White et al. | |
| 4,453,890 A | 6/1984 | Brantley | |
| 4,527,912 A | 7/1985 | Klusman | |
| 4,676,667 A | 6/1987 | Komatsu et al. | |
| 4,687,346 A | 8/1987 | Suciu | |
| 4,693,616 A * | 9/1987 | Rohra et al. | 384/99 |
| 4,722,618 A * | 2/1988 | Matsumoto et al. | 384/536 |
| 4,827,712 A | 5/1989 | Coplin | |
| 4,872,767 A | 10/1989 | Knapp | |
| 4,971,457 A | 11/1990 | Carlson | |
| 5,088,840 A * | 2/1992 | Radtke | 384/535 |
| 5,433,584 A | 7/1995 | Amin | |
| 5,603,602 A | 2/1997 | Romani | |
| 5,735,666 A | 4/1998 | Johnston | |
| 5,974,782 A | 11/1999 | Gerez | |
| 6,002,778 A | 12/1999 | Rossetti et al. | |
| 6,073,439 A | 6/2000 | Beaven et al. | |
| 6,098,399 A | 8/2000 | Richards et al. | |
| 6,099,165 A | 8/2000 | Tremaine | |
| 6,109,022 A | 8/2000 | Allen et al. | |
| 6,240,719 B1 | 6/2001 | Vondrell et al. | |

(Continued)

Primary Examiner—Richard W L Ridley
Assistant Examiner—James Pilkington
(74) Attorney, Agent, or Firm—William Scott Andes, Esq.; Armstrong Teasdale LLP

(57) ABSTRACT

A bearing assembly for a gas turbine engine rotor includes, in an exemplary, an inner race, an outer race assembly, and a rolling element. The outer race assembly includes a body, a plurality of first springs attached to the body, and a plurality of second springs. Each first spring is radially aligned with a corresponding second spring forming a spring pair. The outer race assembly also includes a plurality of connecting members. Each connecting member extends between and connects a first end of the first spring and a first end of the second spring of said spring pair. The outer race assembly further includes a flange with each second spring attached to the flange.

17 Claims, 3 Drawing Sheets

U.S. PATENT DOCUMENTS 6,276,837 B1 * 8/2001 Iwano ................... 384/536
6,443,698 B1   9/2002 Corattiyil et al.
6,540,483 B2 * 4/2003 Allmon et al. ................ 416/1

* cited by examiner

APPARATUS FOR CENTERING ROTOR ASSEMBLY BEARINGS

BACKGROUND OF THE INVENTION

This application relates generally to gas turbine engine rotor assemblies and, more particularly, to bearing assemblies for gas turbine engine rotor assemblies.

Gas turbine engines typically includes a fan rotor assembly, a compressor, and a turbine. The fan rotor assembly includes a fan including an array of fan blades extending radially outward from a rotor shaft. The rotor shaft transfers power and rotary motion from the turbine to the compressor and the fan, and is supported longitudinally with a plurality of bearing assemblies. Bearing assemblies support the rotor shaft and typically include rolling elements located within an inner race and an outer race.

Additionally, at least some known bearing assemblies include a plurality of identical springs attached to the bearing outer race. The springs are spaced equally in a single row circumferentially around the rotor shaft to provide a discrete radial stiffness to the bearing and to center the outer race with respect to the support frame. A first end of the springs is attached to the bearing assembly outer race, and a second end of the springs is attached to a flange coupled to a support frame.

During operation, an unbalance within the engine may cause the engine rotor shaft to displace radially. The radial displacements of the shaft are transmitted to the bearing assembly. Because the springs are arranged in a single circumferential row, the deflection of each spring is the same. A parallel or dual row configuration facilitates optimizing the weight of the bearing assembly by utilizing a shorter axial space. However, this configuration also reduces the spring bending stresses, thus increasing fatigue life. In this stress field, a generic single row configuration would require more springs, a greater material strength, greater cross-sectional inertia, and/or an increased spring length. As a result, a cost and weight of the bearing assembly would increase.

To minimize the effects of potentially damaging radial forces, the number of springs, the cross-sectional area, and the length of the springs are often increased. As a result, the cost and weight of the bearing assembly is also increased.

BRIEF DESCRIPTION OF THE INVENTION

In one aspect, a bearing assembly for a gas turbine engine rotor is provided. The bearing assembly includes an inner race, an outer race assembly, and a rolling element. The outer race assembly includes a body, a plurality of first springs attached to the body, and a plurality of second springs. Each first spring is radially aligned with a corresponding second spring forming a spring pair. The outer race assembly also includes a plurality of connecting members. Each connecting member extends between and connects a first end of the first spring and a first end of the second spring of said spring pair. The outer race assembly further includes a flange with each second spring attached to the flange.

In another aspect, a rotor assembly is provided that includes a rotor shaft and a bearing assembly configured to support the rotor shaft on a support frame. The bearing assembly includes an inner race, an outer race assembly, and a rolling element. The outer race assembly includes a body, a plurality of first springs attached to the body, and a plurality of second springs. Each first spring is radially aligned with a corresponding second spring forming a spring pair. The outer race assembly also includes a plurality of connecting members. Each connecting member extends between and connects a first end of the first spring and a first end of the second spring of said spring pair. The outer race assembly further includes a flange with each second spring attached to the flange.

DETAILED DESCRIPTION OF THE INVENTION

Figure 1:
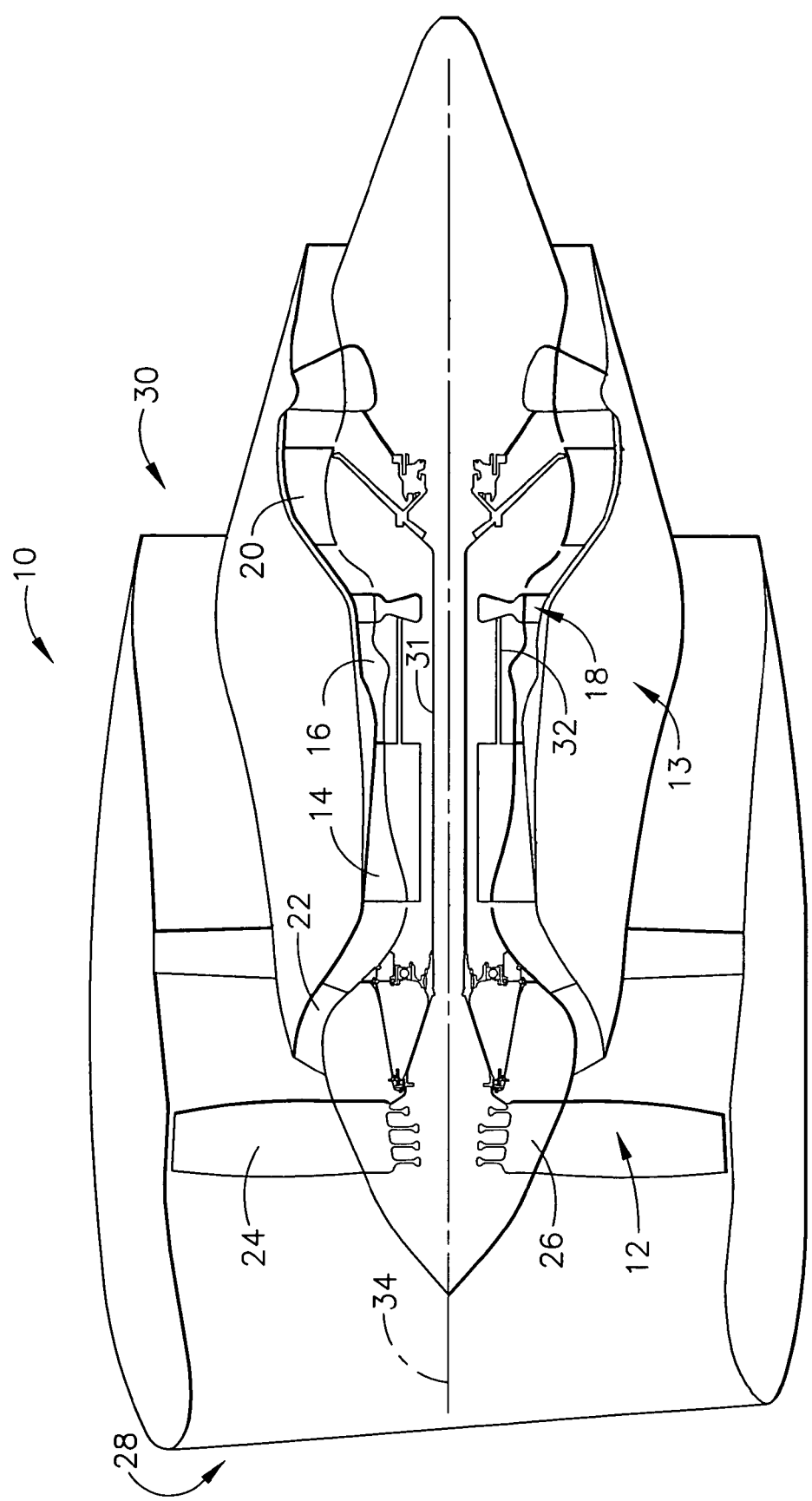
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
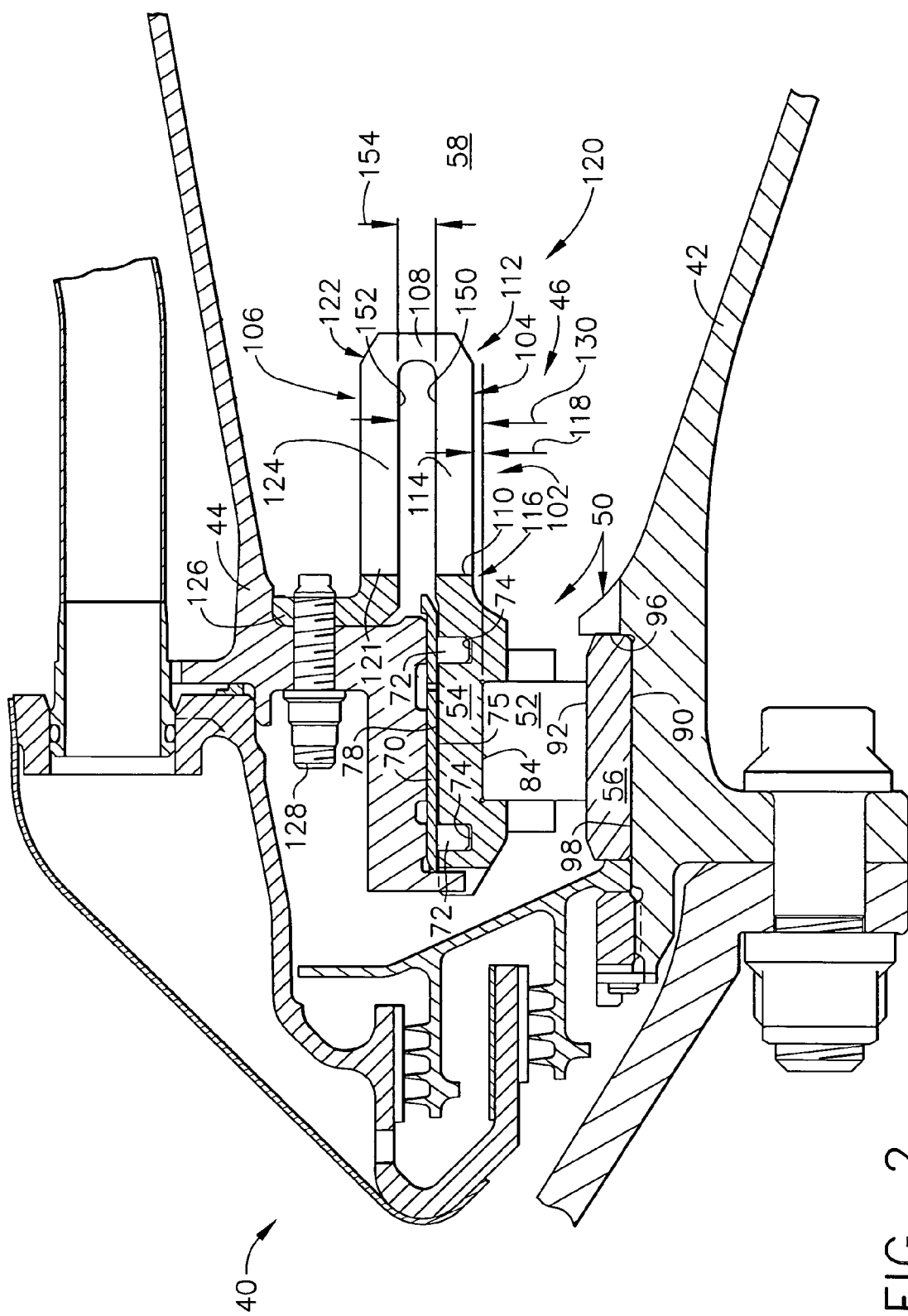
FIG. 2 is a cross-sectional schematic illustration of an exemplary embodiment of a rotor assembly used in the gas turbine engine shown in FIG. 1.

FIG. 2 is a cross-sectional view of an exemplary embodiment of a rotor and bearing assembly 40 that may be used with a gas turbine engine, such as engine 10 shown in FIG. 1. In one embodiment, the gas turbine engine is a GE90 available from General Electric Company, Cincinnati, Ohio. Rotor and bearing assembly 40 includes rotor disc 26 (shown in FIG. 1) and a rotor shaft 42 which supports an array of fan blades 24 (shown in FIG. 1) that extend radially outward from rotor disc 26. Rotor shaft 42 is rotatably secured to a structural support frame 44 with a plurality of bearing assemblies 46 that support rotor shaft 42.

In an exemplary embodiment, each bearing assembly 46 includes a paired race 50 and a rolling element 52. In one embodiment, bearing assembly 46 includes an oil film damper. Paired race 50 includes an outer race 54 and an inner race 56 radially inward from outer race 54. Rolling element 52 is located between inner race 56 and outer race 54. Bearing assembly 46 is enclosed within a sealed annular compartment 58 radially bounded by rotor shaft 42 and bearing support 44.

Support frame 44 includes an annular support sleeve 70 and a plurality of rings 72 sized to be received within a plurality of slots 74 defined within outer race 54. Outer race 54 is positioned such that a gap 75 is defined between race 54 and annular support sleeve 70.

A face 84 of outer race 54 receives rolling element 52 in rollable contact. Inner race 56 includes an inner surface 90 and an inner face 92 that receives rolling element 52 in rollable contact. Inner race 56 is secured within a recess 96 in shaft 42 such that inner race inner surface 90 is adjacent an outer surface 98 of recess 96.

Figure 3:
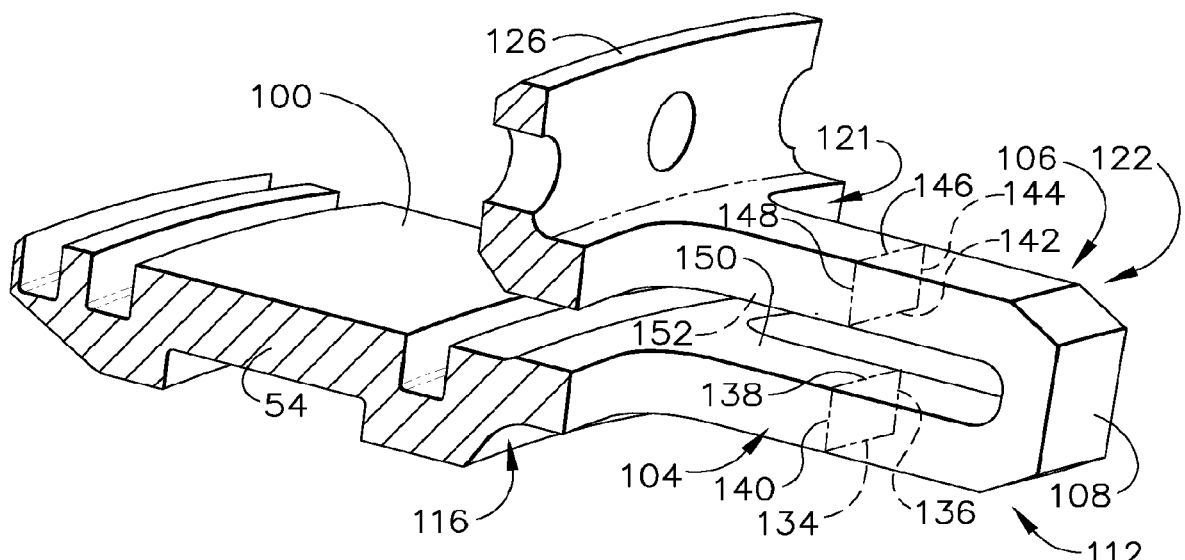
FIG. 3 is a perspective schematic illustration of a portion of the bearing centering sub-assembly shown in FIG. 2.
Figure 4:
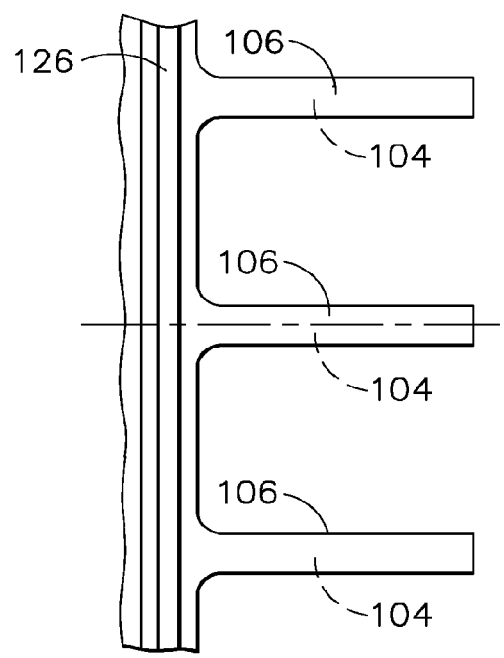
FIG. 4 is a radial schematic illustration of a portion of the bearing centering sub-assembly shown in FIG. 2.

Referring also to FIGS. 3 and 4, outer race 54 includes a body 100 and a plurality of springs 102 that extend circumferentially around engine 10. More specifically, outer race 54 includes a plurality of first springs 104, a plurality of second springs 106, and a plurality of connecting members 108. Springs 104 and 106 extend circumferentially around engine 10 in rows (shown in FIG. 4).

Each first spring 104 includes a forward end 110, an aft end 112, and a body 114 extending therebetween. Each first spring forward end 110 is coupled to a downstream side 116 of outer race body 100, such that first spring body 114 extends downstream from outer race body 100. More specifically, each first spring 104 is attached a radial distance 118 outward from rolling element 52. Each first spring aft end 112 is coupled to a corresponding connecting member 108 downstream from outer race body 100 within annular compartment 58. In one exemplary embodiment, connecting member 108 is a third spring.

Each second spring 106 includes a forward end 121, an aft end 122, and a body 124 extending therebetween. Each second spring forward end 121 is attached to a flange 126 that is coupled to support frame 44 with a fastener 128, such that second spring body 124 extends downstream from support frame 44. Additionally, as fastener 128 secures flange 126 to support frame 44, outer race 54 is then secured in position to support frame 44.

Each second spring 106 is attached a radial distance 130 outward from rolling element 52. Radial distance 130 is greater than radial distance 118. Each second spring aft end 122 is coupled to a corresponding connecting member 108 downstream from outer race body 100 within annular compartment 58, such that connecting member 108 extends between corresponding springs 104 and 106 and define a spring pair 120. In alternate embodiments, connecting member 108 can be considered a third spring because of the relative flexibility of connecting member 108 to springs 104 and 106. In the exemplary embodiment shown in FIGS. 2-4, outer race body 100, first springs 104, second springs 106, and connecting members 108 are formed as one piece. In alternate embodiments, outer race body 100, first springs 104, second springs 106, and connecting members 108 are formed as separate elements that are attached by any suitable method, for example with fasteners and/or welding.

In the exemplary embodiment, each first spring body 114 has a rectangular cross section and includes a first side 134, a second side 136, a third side 138 and a fourth side 140. First side 134 is substantially parallel to third side 138, and second side 136 is substantially parallel to fourth side 140. Also, each second spring body 124 has a rectangular cross section and includes a first side 142, a second side 144, a third side 146 and a fourth side 148 where first side 142 is substantially parallel to third side 146, and second side 144 is substantially parallel to fourth side 148. A cross sectional area of each first spring body 114 is substantially the same from forward end 110 to aft end 112, and a cross sectional area of each second spring body 124 is substantially the same from forward end 121 to aft end 122. In alternate embodiments, spring bodies 114 and 124 can have a polygonal cross section, a circular cross section, or an elliptical cross section.

Bearing centering sub-assembly first and second spring bodies 114 and 124 each include an inner surface 150 and 152, respectively. In the exemplary embodiment, because each surface 150 and 152 is substantially planar, and because spring bodies 114 and 124 are substantially parallel, a distance 154 between bearing centering sub-assembly springs 104 and 106 remains substantially constant. In alternate embodiments, spring bodies 114 and 124 are not parallel and distance 154 can vary from forward ends 110 and 121 to aft ends 112 and 122.

During engine operation, in the exemplary embodiment, an unbalance of engine 10 may cause high radial forces to be applied to fan assembly 12 (shown in FIG. 1) and bearing assembly 46. More specifically, during engine operation high rotor deflection may induce radial movement of outer race 54. The radial force is transmitted to support frame 44 through springs 102. More specifically, as outer race body 100 is forced radially outward as a result of rotor deflection, because first spring 104 is attached to outer race body 100, the radial movement is transmitted to first spring 104.

Furthermore, because springs 104 and 106 are coupled with connecting member 108, the radial force is then transmitted through second spring 106 to support frame 44. More specifically, because springs 104 and 106 are coupled with connecting member 108, when rotor shaft 42 deflects, spring 104 is radially displaced a distance that is equal to a distance spring 106 is radially displaced.

A sum of the amount of deflection of springs 104 and 106 is equal to a total deflection at outer race body 100. A total radial stiffness is given by:

$$\frac{1}{K_1} + \frac{1}{K_2} = \frac{1}{K_t} \qquad (1)$$

where $K_1$ is a stiffness of spring 104, $K_2$ is a stiffness of spring 106, and $K_t$ is a total stiffness for outer race 54. In an another embodiment, connecting member 108 is a third spring, and $K_3$ is a stiffness of connecting member 108 and the total radial stiffness is given by:

$$\frac{1}{K_1} + \frac{1}{K_2} + \frac{1}{K_3} = \frac{1}{K_t}. \qquad (2)$$

First springs 104 and second springs 106 extend circumferentially around engine 10 in rows 160 and 162, respectively. More specifically, springs 104 and 106 are oriented circumferentially such that each first spring 104 is radially aligned with respect to each corresponding second spring 106 and is connected to second spring 106 with each corresponding connecting member 108, as shown in FIG. 4. As a result, when outer race body 100 is not anti-rotated, both springs 104 and 106 yield in bending and reduce in length by an equal amount when circumferential force is transmitted from outer race body 100. Circumferential force is created when rotor unbalance loads are significant such that the radial gap 75, between race 54 and support sleeve 70, is diminished or bottomed. This results in a net axial translation or displacement of rolling elements 52 on bearing inner race surface 92 equal approximately zero.

Additionally because springs 102 are connected serially, springs 104 and 106 have approximately fifty percent less stress than non-serially connected springs (not shown) for a given system stiffness due to each spring's deflection being half of the total deflection. This facilitates longer fatigue life for a given rotor unbalance load.

The above-described rotor assembly is cost-effective and highly reliable. The rotor assembly can reduce the dynamic radial forces to the engine support frame and the bearing assembly which results in extended engine service life and performance. Further, specifying the spring total stiffness permits for structural tuning, decreasing the dynamic response at specific flight points. This provides for extended engine service life and performance.

While the invention has been described in terms of various specific embodiments, those skilled in the art will recognize that the invention can be practiced with modification within the spirit and scope of the claims.

What is claimed is:

1. A bearing assembly for a gas turbine engine rotor, said bearing assembly comprising:
   an inner race;
   an outer race assembly; and
   a rolling element;
   said outer race assembly comprising:
   a body;
   a plurality of first springs attached to said body;
   a plurality of second springs, each said first spring radially aligned with a corresponding said second spring forming a spring pair;
   a plurality of connecting members, each said connecting member extending between and connecting a first end of said first spring and a first end of said second spring of said spring pair such that a spring force is induced from each of said connecting members to each of said first springs and said second springs; and
   a flange, said second springs attached to said flange.

2. A bearing assembly in accordance with claim 1 wherein each said first spring comprises a polygonal cross section and each said second spring comprises a polygonal cross section.

3. A bearing assembly in accordance with claim 2 wherein a cross sectional area of each said first spring is substantially the same from said first end to a second end of said first spring, and a cross sectional area of each said second spring is substantially the same from said first end to a second end of said second spring.

4. A bearing assembly in accordance with claim 2 wherein a cross sectional area of each said first spring varies from said first end to a second end of said first spring, and a cross sectional area of each said second spring varies from said first end to a second end of said second spring.

5. A bearing assembly in accordance with claim 1 wherein each said first spring comprises a substantially rectangular cross section and each said second spring comprises a substantially rectangular cross section.

6. A bearing assembly in accordance with claim 5 wherein each said first spring comprises a first side, a second side, a third side and a fourth side, said first side substantially parallel to said third side, and said second side substantially parallel to said fourth side, and each said second spring comprises a first side, a second side, a third side and a fourth side, said first side substantially parallel to said third side, and said second side substantially parallel to said fourth side.

7. A bearing assembly in accordance with claim 1 wherein each said first spring and second spring of said spring pair are substantially parallel.

8. A bearing assembly in accordance with claim 1 wherein said plurality of said second springs are a first radial distance from said rolling element, and said plurality of said first springs are a second radial distance from said rolling element, said first radial distance is greater than said second radial distance.

9. A bearing assembly in accordance with claim 1 wherein said plurality of first springs and said plurality of second springs deflect an identical distance when subjected to radial force.

10. A rotor assembly comprising:
    a rotor shaft; and
    a bearing assembly configured to support said rotor shaft on a support frame, said bearing assembly comprising:
    an inner race;
    an outer race assembly; and
    a rolling element;
    said outer race assembly comprising:
    a body;
    a plurality of first springs attached to said body;
    a plurality of second springs, each said first spring radially aligned with a corresponding said second spring forming a spring pair;
    a plurality of connecting members, each said connecting member extending between and connecting a first end of said first spring and a first end of said second spring of said spring pair such that a spring force is induced from each of said connecting members to each of said first springs and said second springs; and
    a flange, said second springs attached to said flange.

11. A rotor assembly in accordance with claim 10 wherein each said first spring comprises a polygonal cross section and each said second spring comprises a polygonal cross section.

12. A rotor assembly in accordance with claim 11 wherein a cross sectional area of each said first spring is substantially the same from said first end to a second end of said first spring , and a cross sectional area of each said second spring is substantially the same from said first end to a second end of said second spring.

13. A bearing assembly in accordance with claim 11 wherein a cross sectional area of each said first spring varies from said first end to a second end of said first spring, and a cross sectional area of each said second spring varies from said first end to a second end of said second spring.

14. A rotor assembly in accordance with claim 10 wherein each said first spring comprises a substantially rectangular cross section and each said second spring comprises a substantially cross section.

15. A rotor assembly in accordance with claim 14 wherein each said first spring comprises a first side, a second side, a third side and a fourth side, said firstside substantially parallel to said third side, and said second side substantially parallel to said fourth side, and each said second spring comprises a first side, a second side, a third side and a fourth side, said first side substantially parallel to said third side, and said second side substantially parallel to said fourth side.

16. A rotor assembly in accordance with claim 10 wherein each said first spring and second spring of said spring pair are substantially parallel.

17. A rotor assembly in accordance with claim 10 wherein said plurality of said second springs are a first radial distance from said rolling element, and said plurality of said first springs are a second radial distance from said rolling, said first radial distance is greater than said second radial distance.

* * * * *